Jan. 16, 1968  W. J. BECKER ETAL  3,364,023
FORMATION OF SILVER IMAGES FROM ULTRAVIOLET-LIGHT-INDUCED
BENZO-INDOLINOSPIROPYRAN DYE IMAGES
Filed Feb. 4, 1964
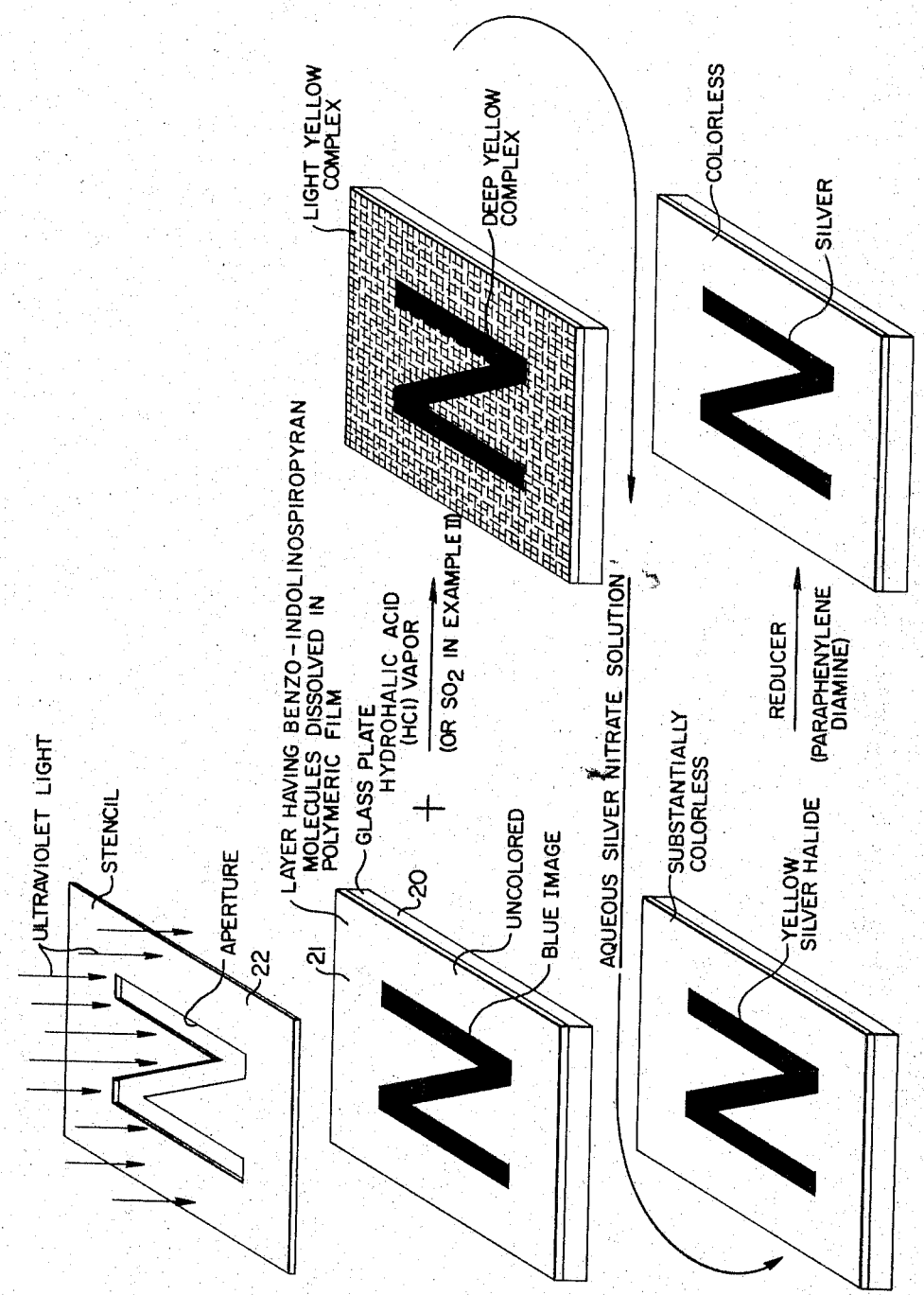
INVENTORS
WILLIAM J. BECKER &
PETER L. FORIS
BY
THEIR ATTORNEYS 3,364,023
FORMATION OF SILVER IMAGES FROM ULTRAVIOLET - LIGHT - INDUCED BENZOINDOLINOSPIROPYRAN DYE IMAGES
William J. Becker and Peter L. Foris, Dayton, Ohio, assignors to The National Cash Register Company, Dayton, Ohio, a corporation of Maryland
Filed Feb. 4, 1964, Ser. No. 342,492
6 Claims. (Cl. 96—27)

ABSTRACT OF THE DISCLOSURE

The invention relates to formation of silver images from ultraviolet-light-induced dye images of benzoindolinospiropyran molecules intermediately converted with hydrohalic acid gas, and finally by a silver salt and reducer, thereby obtaining a silver image of molecular definition.

---

This invention relates to a process for creating a silver image from a light-sensitive dye image, and to its product. The so-produced silver image is co-extensive with the dye image, which in an intermediate step has been formed as a complex with the vapors of a hydrohalic acid.

The dye materials are molecules of photochromic benzo-indolinospiropyran compounds which have the property of changing their molecular configuration from a normal, "colorless," state, in which the materials have no visible color, or a very faint visible color, to a "colored" state of strong hue, in resopnse to being subjected to ultraviolet light radiation. This "colored" state is reversible, at will, to the normal state by the projection of light of longer wave lengths—say those of the yellow to the infrared regions of the spectrum—onto the photochromic material. A very important consideration is that each molecule of the photo chromic material which exists in the "colored" state has a tendency to revert to the "colorless" state, due to the effect of the ambient temperature, the molecules of some compounds reverting at a faster rate at a given temperature than other compounds—some being very fleeting in the "colored" state at room temperature, while others exist for hours, days, months, and longer in the "colored" state—but all eventually reverting to the "colorless" state after the passage of the allotted time. Many of the eligible dye compounds exist in the "colored" state for a practical length of time at room temperature and which are of the benzo indolinospiropyran type are well known through the disclosures of the United States patent of Elliot Berman Nos. 3,022,318, 3,072,481, 3,090,687, and 3,100,778. These compounds generally have the property in a solution state (whether it be a liquid solution or a solid solution) or in an amorphous state, of changing from the "colorless" form to the "colored" form on the application of ultraviolet light of the order of 3,600 Angstroms in wave length, and exhibit a dark blue color in the "colored" state, except that in some instances in solution, depending on the nature of the solvent, the "colored" state is of a reddish characteristic.

It has been found that these eligible componds readily react to the vapors of hydrohalic acids, the "colored" molecules forming, with such vapors, complexes that are heat-stable though of a deep yellowish color impractical for visibility purposes, thus "fixing" any such molecules that are in the "colored" state as images represented in such deep yellow terms, for as long as such complexes exist. The halogen vapor normally escapes spontaneously from its complex with the "colorless" molecules upon the passage of time measured in minutes, depending upon the materials in which the dye molecules are situated, such time being longer if the molecules are held in a film of a polymeric material. The remaining deep yellow complex of the image is visible against the de-complexed "colorless" background after the vapors pass off. It also is possible to make a short-lived complex of the molecules of the layer before image-formation, and create the fixed image before the vapors escape.

Therefore, it is possible to provide a starting film or a plate on or in which there is a profusion of benzo-indolinospiropyran material molecules, in layer form, which layer not only has had an image impressed upon it by ultraviolet light, but which image is fixed as a deep yellow halogen-acid complex. This fixed image preferably is brought about by the use of HCl vapor or HBr vapor, as they are the most easily handled of the hydrohalic-acid vapors. The formation of the hydrohalic-acid-fixed image is followed by a conversion of it to silver. The choice of HCl or HBr vapors does not preclude the use of other hydrohalic acid vapors in the process.

In some situations, by manipulating the process in terms of time and treatment of the materials, the background is turned to a denser silver form than the image itself, thus creating a reversal type of image product.

Although for the purpose of creating an image which is not easily physically rubbed off of a support surface, the solid-solution form of the benzo-indolinospiropyran material is preferred, it is within the intent of the invention to create, on a surface of a support web or plate, such silver image without a binder. Such a film or layer must be of a nature in which the molecules are in closely-spaced relation, but not a crystalline structure. The molecules in the amorphous film are free to change their configuration from the "colorless" state to the "colored" state individually. The amorphous layer in the solid state may be created by the evaporation of a liquid solution of the benzo-indolinospiropyran material that contains no film-former or binder material, such liquid solution being applied to the web—the solvent, which is volatile, evaporating off under a controllable circumstance to leave an amorphous deposit. If there is any tendency of the chosen material to crystallize on drying, a closely-related compound is mixed with the contrary compound, its presence tending to prevent the crystallization. The purer the compound that is used, the more tendency there is towards crystallization of it when it is being dried from solution, and, hence, an impure compound is more apt to give a satisfactory amorphous film than is a pure compound.

A mixture of different benzo-indolinospiropyran molecules in a layer may have some practical value, beyond that of preventing crystallization, because of the widening of the range of conditions of response to ultraviolet light, and incidentally with respect to the heat-reversion of the molecules from the "colored" state. From what is to be said later on, it will become apparent that, if the image is formed by ultraviolet light, before the layer is treated with hydrohalic-acid vapors, the acid-vapor treatment must occur before the ambient heat causes the image to disappear, in whole or in part, to the "colorless" state.

If it is desired to use a layer of the solid-solution type benzo-indolinospiropyran material molecules may be dissolved in a film former of polymeric material. It has been found that a hydrophobic cellulose-derivative type of polymeric film material is eminently suitable, because it is relatively inert as to the hydrohalic-acid vapors and other chemical compounds used for developing the silver image, and because it tends to swell in an aqueous environment to a degree that permits relatively easy and efficient penetration of the layer by the reactant compounds in liquid form that are used in the process to be described. As of present knowledge, cellulose acetate butyrate is the most useful of such film formers for carrying out the steps of this invention, although analogous compounds, such as ethyl cellulose, cellulose acetate, and nitrocellulose, can be substituted therefor. If a solid-solution layer is used, the dye is dissolved in an organic solvent solution of the film-forming polymeric material to an amount of several percent, by weight, and applied to a surface and dried to form the film layer with which the invention is to be carried out.

After a layer of dye-sensitized material is prepared, the image which it is desired to make is formed thereon by a "writing" process wherein either a cone of ultraviolet light is applied to the layer, through a stencil or through any other type of light-control means, or a beam of ultraviolet light is caused to trace an image on the layer. After formation of the image, the layer is subjected to the vapors of one of the hydrohalic acids—for instance, HCl vapor—which after a few seconds or minutes of exposure, depending on the thickness of the layer and whether or not there is a solid-solution film to penetrate, forms a yellow complex of the dye material, that part of the area of the layer which has been subjected to ultraviolet light being of a deeper yellow color than the unexposed area. Although the image may be sensed visually by this difference in yellow color, it is by no means a practical form of an image in terms of color during this state of intermediate fixation. This hydrohlic acid vapor-treated layer is a starting material for carrying out the process according to the provisions of this invention.

The layer including the hydrohalic acid vapor-fixed image of dye material thereafter is treated with an aqueous silver nitrate solution of, say, five percent to ten percent concentration, which converts the halide ions present in the image portion of the layer to silver halide. Previous to the treatment with the silver nitrate solution, the complex dye material molecules forming the unexposed areas are unstable and will revert to the original "colorless" state by reason of the passing-off of the hydrohalic-acid vapor, which occurs in a matter of a few minutes, and such vapor loss can be accelerated by the application of more than the environmental heat. This silver-halide-containing layer then is treated with a photographic reducing agent such as, for example, an alkaline solution of para-phenylene-diamine, to form a true silver image.

This invention involves no silver salt crystals nor image resolution limits imposed by crystal size in the formation of images by direct action of photons on crystals. The photons in the process of this invention act on molecules of dye to convert them to an active condition in which they may be replaced chemically by silver atoms. Therefore the resolution of the chemical system of the invention is far beyond the power of resolution of any optical system and is, for that reason, capable of use in making clear micro-images.

With these matters in mind, the invention will be described in conjunction with the drawing and with the preferred and other examples, disclosing particularly amounts of certain materials to illustrate the various steps which make up the novel process.

The drawing is a diagrammatical representation of the steps of the process in a flow-sequence form.

Example 1

In this example, the 5-chloro,-6'-nitro derivative of the parent benzo-indolinospiropyran compound, having the structural formula

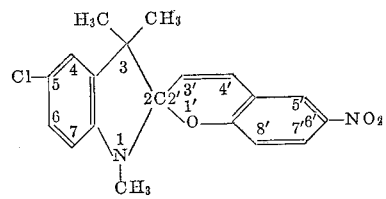

is used.

The dye compound in an amount of 1.5 parts by weight is dissolved in 35 parts by weight of a 10% w./w. solution of cellulose acetate butyrate (preferably that type known as "one-half-second butyrate") dissolved in methyl ethyl ketone and is used as a coating material, being applied to a clean glass slide 20 as a thin layer, as by use of a coating blade. The wet slide then is spun on a vertical axis to get rid of the excess solution, and is dried to a point where the residual film 21 is in a rigid state and of a transparent nature. This "one-half-second butyrate" is a trade designation for a cellulose acetate butyrate of approximately 38% butyryl content. If desired or necessary, other polymeric materials, or even the same polymeric material with other butyryl content, may be used instead or mixed therewith, to change the characteristics of the film to aid in its swelling action in the presence of the liquids used in the remainder of the process. As has been said, this swelling action aids in the penetration of the liquid materials to give an efficient chemical reaction throughout the film. Polyvinylmethylether-maleic anhydride may be used as the addition agent to promote swelling. After this plate has been prepared, it is subjected to the specified ultraviolet light, as by exposure through the stencil 22, which masks out the ultraviolet light in the background area, to form the blue image "N," with a more or less colorless background. This slide with the blue image is exposed to HCl vapor for five to eight minutes, removed from the hood, and set aside until the vapors sublime from the background material (five minutes more or less being sufficient), the complex of the vapor with the image portion molecules remaining fixed in a yellow color against thermal decay. This plate so far has been subjected to image formation, and the process of making such an image has been disclosed in applicant Peter L. Foris' co-pending United States patent application Ser. No. 338,136, filed Jan. 16, 1964, to which reference is made for further examples. In that application, Ser. No. 338,136, the parent compound, benzo-indolinospiropyran, having the structure

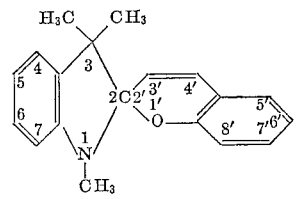

is shown, and the specific derivatives

6'-nitro-5',7'-dichloro
6'-nitro-7',8'-dichloro
5',6',8'-trichloro-7'-nitro
7'-nitro-8'-carbomethoxy
6'-nitro-7'-chloro
5',6'-dinitro-8'-methoxy
6'-nitro-8'-fluoro
6'-nitro-8'-iodo
6'-nitro-8'-bromo
5'-nitro-6',8'-dichloro
6'-bromo-8'-nitro
8'-iodo-8'-nitro
6'-chloro-8'-nitro are specifically set forth, together with a reference to United States Patent No. 3,100,778 (before mentioned), which issued Aug. 13, 1963, on the application of Elliot Berman and which contains thousands of equivalents. That application also discloses the naphtho-pyran analog and the 1-phenyl derivative, as well as those in which the 3-carbon atom has been replaced with O or S. The slide now is placed in an aqueous solution of silver nitrate containing a small amount of a lower aliphatic alcohol, such as ethyl alcohol, which results in the formation of a silver halide image in just a few minutes. A typical aqueous silver nitrate stock solution is made of 20 grams of silver nitrate and 400 grams of water. With 35 parts of the stock solution there is mixed up to 15 parts of ethyl alcohol. The plate is submerged in the solution for five minutes, more or less. The plate then is washed with 95% ethyl alcohol to remove the excess silver nitrate solution and remnants of the dye, and developed in a solution of reducing developer in the manner normal to silver halide photography practices. A typical reducing developer may consist of:

| | |
|---|---|
| Para-phenylene-diamine | grams 1 |
| Water | milliliters 35 |
| Ethyl alcohol | do 15 |
| Aqueous solution of sodium hydroxide (10%) | do 5 |

The silver image when thus formed is black and is available for whatever use its reflective or transmission characteristics may be put to.

If the polymer film lifts off the glass support during processing, some type of mutually adhering subcoat may be used.

*Example II*

This example is carried on like Example I in the order of processing steps which frame the scope of the invention. In this example, for variety, a polyester resin film is used as the support base instead of glass, is coated with the dye layer in the manner of Example I, and is allowed to air-dry from a doctor-blade draw-down thickness (.003 inch). This film is exposed to ultraviolet light strong in 3000–3500 Angstroms, through a light-control mask to produce a blue image. The image is exposed to $SO_2$ vapors for five minutes, which turns only the image part of the layer from blue to yellow. The excess $SO_2$ escapes in normal atmospheric air in several minutes.

In the next step, the plate is exposed to HCl vapor for five minutes and let stand for five minutes in air to let the excess HCl vapors escape.

The vapor-free plate is placed in a bath of 20 grams of silver nitrate dissolved in 400 milliliters of water for five minutes, to form a silver halide image, and finally the plate is washed with water and developed in the well-known D76 developing solution and again washed, this time in ethyl alcohol. The dye-formed image appears in black silver against a colorless background. The D76 formulation contains the followings:

| | |
|---|---|
| Water | liters 3 |
| Elon (p-methylamino phenyl) | grams 8 |
| Sodium sulfite, anhydrous | do 400 |
| Hydroquinone | do 20 |
| Borax | do 8 |
| Water to make 4 liters. | |

*Example III*

In this example there is a reversal of the image in that the background of the film has a silver image formed of it, whereas the image portion of the background has a less dense silver image formed of it, so that there is a visibly "reversed" effect.

This is like Example II except that there is no $SO_2$ exposure step.

It will be seen that the invention, as regards the process, consists in essence of the steps of forming an image in a photochromic layer of non-crystalline molecules of photochromic dye material by subjecting the layer to a pattern of ultraviolet light; treating the layer to the vapors of a hydrohalic acid to form a halogen complex image; subjecting the complex image to an aqueous silver salt solution which reacts with the dye halogen-acid-vapor-fixed molecules to form a silver halide salt; and finally reducing the silver halide salt form of the image molecules to silver by a treatment with a photographic reducing developer. The various examples indicate that the penetration of the various materials and their treatment with other materials are productive of different silver deposits, according to whether alcohol is used in conjunction with the steps or not, and that the background molecules are differentially affected by $SO_2$ vapors.

Generally speaking, the use of alcohol in the steps results in the background of the image not containing any silver, and the pre-exposure of the dye images to the vapors of $SO_2$ before being subjected to HCl fumes prevents the background from becoming yellow and thus subject to any effect by the reaction with the aqueous silver salt solution. The formation of silver in the background as set forth in Example III is aided by longer exposure to hydrohalic-acid vapors, and the absence of alcohol as a washing material after the exposure to the hydrohalic-acid vapors.

The invention generally applies to very thin films of material, so that the vapors of the hydrohalic acid may penetrate them, and the wet treatment following is aided by the swelling of the film material.

The silver image, when completed, may be used for whatever purposes metal images are used for in the fields of optics and electric phenomena, and as protective media such as a metallic surface or a metallic film will provide.

With these objects in view, the invention includes the films made by the process, inasmuch as they cannot adequately be described in any other fashion than by the process of making them.

If all the photochromic dye has not been transformed into silver and still exists either in the image portion or in the background portion of the layer, and has not been washed out with alcohol, it is still available for dye-ultraviolet-light image-formation.

What is claimed is:
1. A method of making silver images, including the steps of:
 (a) forming a solid layer of benzo-indolinospiropyran molecules in non-crystalline state;
 (b) subjecting the layer of (a) to a pattern of ultraviolet light to form an image;
 (c) subjecting the layer of (b) to vapors of a hydrohalic acid until a complex of yellow color is formed with the image portion of the layer;
 (d) treating the layer of (c) to an aqueous solution of silver nitrate to form a silver halide compound of the image portion of the layer; and
 (e) treating the layer of (d) with a silver halide reducing developer to convert the image to silver.

2. A silver image formed according to the process of claim 1.

3. The method of claim 1 followed by the step of washing the layer with ethanol.

4. A silver image formed according to the process of claim 3.

5. A method of making silver images, including the steps of:
 (a) forming a solid layer of benzo-indolinospiropyran molecules in the non-crystalline amorphous state;
 (b) subjecting the layer of (a) to a pattern of ultraviolet light to form an image;
 (c) subjecting the layer of (b) to $SO_2$ gas for several minutes;
 (d) subjecting the layer of (c) to vapors of a hydrohalic acid until a complex of yellow color is formed in the image portion of the layer;

(e) treating the layer of (d) to an aqueous solution of silver nitrate to form a silver halide of the image portion; and (f) treating the layer of (e) with a silver-halide reducing developer to convert the image to silver.

6. A silver image made according to the process of claim 5.

References Cited

UNITED STATES PATENTS 3,152,903　10/1964　Shepard _____ 96—90
3,212,898　10/1965　Cerreta _____ 96—90

J. TRAVIS BROWN, *Primary Examiner.*

C. E. DAVIS, *Assistant Examiner.*